Nov. 10, 1953    C. H. CUPPETT ET AL    2,658,237
INJECTION MOLDING APPARATUS
Filed Dec. 14, 1948    4 Sheets-Sheet 1
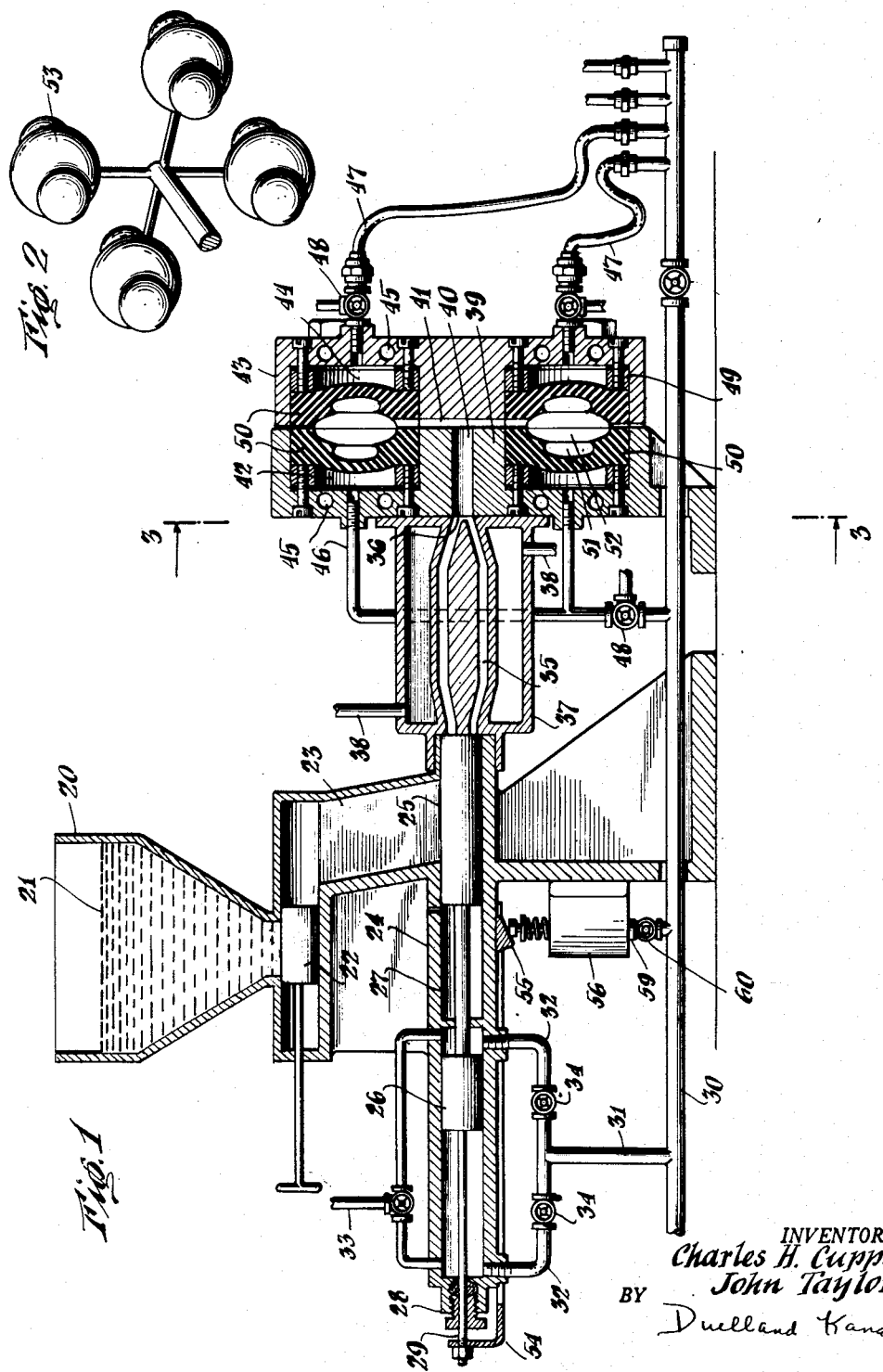
INVENTORS
Charles H. Cuppett
John Taylor
BY
Duelland Kane
ATTORNEYS

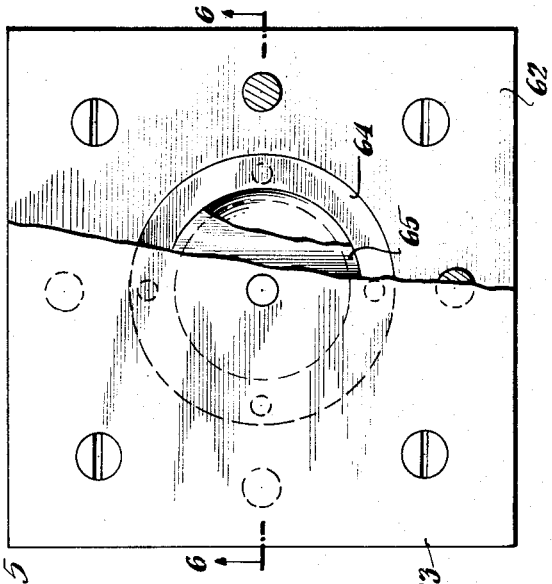
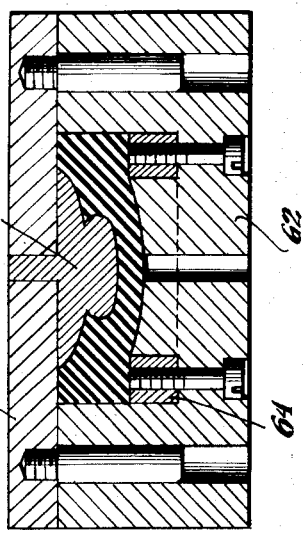
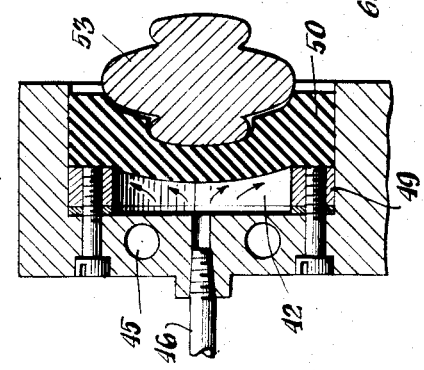
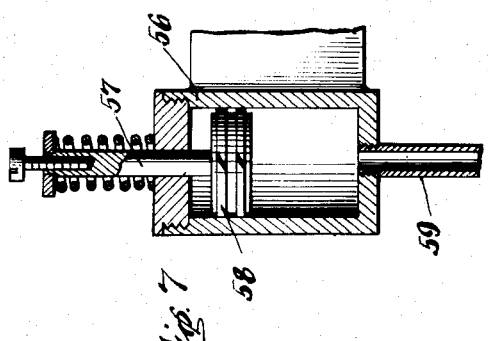
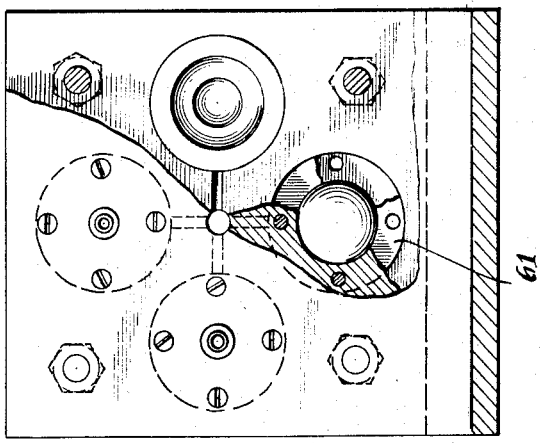

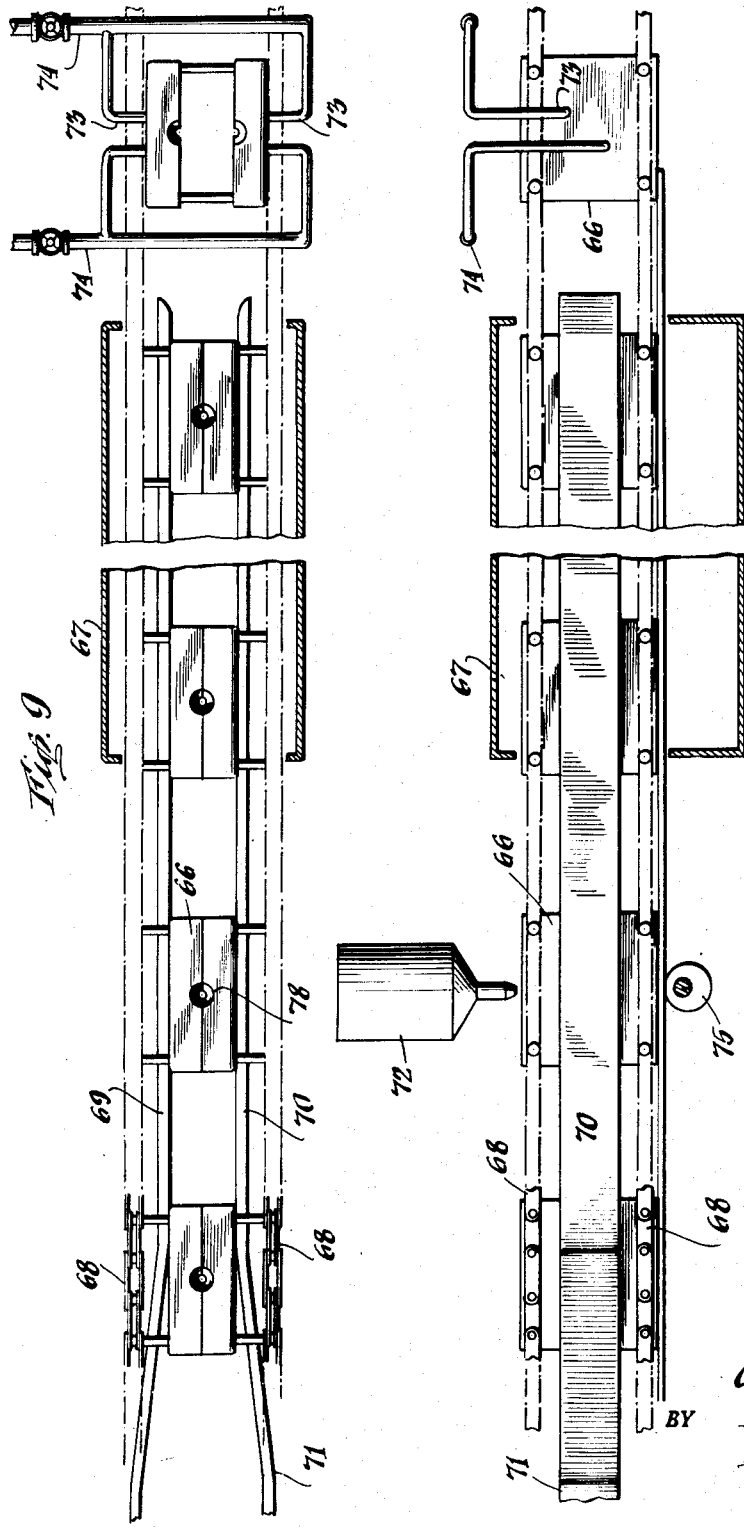

Nov. 10, 1953 — C. H. CUPPETT ET AL — 2,658,237
INJECTION MOLDING APPARATUS
Filed Dec. 14, 1948 — 4 Sheets-Sheet 4

INVENTORS
Charles H. Cuppett
John Taylor
BY
Duell and Kane
ATTORNEYS

Patented Nov. 10, 1953

2,658,237

UNITED STATES PATENT OFFICE 2,658,237

INJECTION MOLDING APPARATUS

Charles H. Cuppett, Packanack, N. J., and John Taylor, Bronxville, N. Y., assignors to Hydraulic Molds Corporation, New York, N. Y., a corporation of New York Application December 14, 1948, Serial No. 65,098

4 Claims. (Cl. 18—30)

This invention relates to a novel and improved method of molding and especially the molding of plastics. Also, by means of the present invention, functionally and structurally improved molding apparatus is provided and which is especially useful in the practice of the novel method.

This application is a continuation in part of our prior application for United States Letters Patent on Molds filed on September 29, 1944, and identified under Serial Number 556,357 now abandoned.

It is an object of the invention to provide improved molding apparatus of simple design and rugged construction capable of being operated by relatively unskilled labor to economically produce molded articles; the present apparatus functioning over long periods of time with freedom from all difficulties.

A further object is that of teaching a method of molding which method will incorporate an improved technique over methods as heretofore practiced and by means of which articles may be produced in large quantities and with minimum expense, aside from the fact that the units thus manufactured will require no removal of fins or other undesired and unnecessary parts.

Another object is that of furnishing an apparatus in which a single mold may be employed to produce articles which are otherwise identical but of different dimensions; the structure of the present invention also furnishing a mold from which the formed articles may be automatically ejected.

An additional object is that of teaching a method and furnishing a machine which will be substantially automatic so that only a minimum of attendance will be necessary.

With these and other objects in mind reference is had to the attached sheets of drawings illustrating practical embodiments of the invention and in which:

Fig. 1 is a somewhat schematic sectional side view of an injection molding machine;

Fig. 2 is a perspective view of one form of product which may be produced by the machine and showing a number of these units with the sprue and runners still in place;

Fig. 3 is a transverse sectional view taken along the lines 3—3 and in the direction of the arrows as indicated in Fig. 1 and with certain of the parts broken away to disclose underlying structures;

Fig. 4 is a sectional view through one assembly of the mold cavities and showing a finished product in process of being ejected therefrom;

Fig. 5 is a plan view of a chase such as may be utilized to provide a mold as herein taught;

Fig. 6 is a transverse sectional view taken along the lines 6—6 and in the direction of the arrows as indicated in Fig. 5;

Fig. 7 is a sectional side view of one of the units of apparatus as generally illustrated in Fig. 1;

Fig. 8 is a somewhat schematic side elevation of an alternative form of molding apparatus;

Fig. 9 is a plan view of the same;

Figure 10:
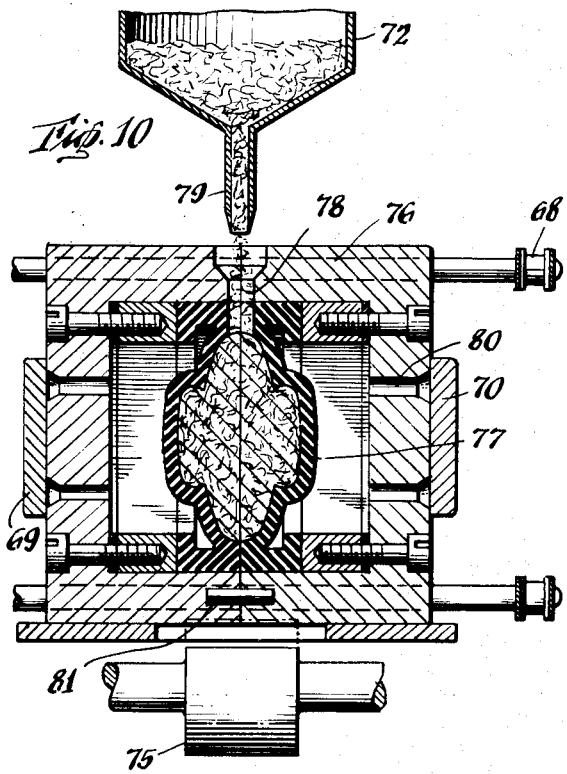
Fig. 10 is a transverse sectional view of the apparatus as illustrated in Figs. 8 and 9, such view being in enlarged scale.

Referring primarily to Fig. 1, it will be seen that reference numeral 20 indicates a hopper or reservoir within which a body of plastic 21 may be disposed. A measuring piston 22 may be reciprocated to allow a certain and predetermined quantity of this material to pass into passage 23 from which it moves into a cylinder 24. Within the latter a ram 25 reciprocates. This ram is driven by a rod 27 connected to a piston 26 also within the cylinder and preferably adjacent the rear end of the same. A further rod 29 may extend outwardly from piston 26 and through a suitable packing assembly 28 for a purpose hereinafter specified.

In order to effect reciprocation of the piston and ram, fluid under pressure is employed. Such fluid may be supplied through a main pressure line 30 to which a line 31 is coupled. Branch lines 32 may extend from line 31 and valves 34 may be interposed in each of these branch lines. A venting line 33 may also be provided. As will be apparent the valve associated with the latter is preferably of the "two-way" type. Therefore, with the latter properly adjusted and one of the valves 34 open, fluid under pressure will be supplied to cylinder 24 to one or the other side of piston 26. Depending upon this, the piston, together with the ram 25, will either be retracted or projected. Simultaneously the rod 29 will be moved in a similar manner. At this time it will be appreciated that the measuring piston 22 and the valves 34 have only been illustrated in a somewhat schematic manner. As is obvious in lieu of hand control, these several elements may be shifted in any desired manner so that a more or less automatic operation of the parts follows.

The ram 25 delivers the material to passages 35 terminating in a nozzle 36. These passages may embrace any desired number and extend through a casing 37 providing a heating chamber. Heat is supplied to the latter by conveniently employing superheated steam which enters through one pipe 38 and is discharged from the chamber through the second of such pipes. From the nozzle 36 the material passes immediately into the sprue 40 formed in a block 39. From the latter the material may pass to runners 41 corresponding in number to the number of mold assemblies which are employed.

In the illustrated embodiments these assemblies are four in number. In order to avoid unnecessary illustration, it has been assumed that only relatively simple articles are to be molded; the molds being correspondingly simplified. This will be illustrative of the present invention. However, as will be understood, the mold assemblies may be of any number and the complexity of configuration of the same will correspond to the ultimate design of the articles which are to be produced and may be vented.

Thus, as shown block 39 may be formed with four cavities 42 at points beyond its central section. A second block 43 is disposed in cooperating relationship with respect to block 39. Block 43 is movable towards and away from the first block and to this end it is supported in any desirable manner so that separation and joining of the blocks may be effected. Also a suitable mechanism (not shown) may be employed for automatically or manually effecting a shifting of the block. Block 43 is formed with cavities 44 corresponding to cavities 42. Both blocks may be formed with passages 45 for the circulation of a coolant by means of which undesired heat may be dispersed, or through which a heating medium may be circulated in the event polymerization requires this. Tubes 46 and 47 may communicate at one of their ends with the spaces 42 and 44. At their opposite ends they may be connected with pressure line 30. Valves 48 are interposed in these tubes and serve to permit of a controlling of the flow of fluid through the same as well as a venting of such fluid. As shown, the outlet of the tubes preferably communicates with the rear portion of the cavities or recesses 42 and 44. The latter may also support suitable mounting 49 by means of which the mold sections are retained in proper positions.

These sections have been indicated by the numeral 50. They are formed of a flexible and preferably resilient material such as rubber. They conveniently present in their operative faces subsidiary cavities 51 and main cavity 52; the latter being separated from the former by overlapping bridge portions such that the finished article will present a protuberance which may primarily bulge outwardly from the main body of the article. Such an article has been indicated by the reference numeral 53 in Fig. 4 and by the same numeral in Fig. 2 which shows an assembly of four of these articles as they emerge from the mold.

While the present invention is capable of use with numerous different plastics, it is especially effective with respect to the plastics which wholly liquefy when heat is used and which are capable of being moved by hydrostatic pressure. These will be plastics such as polyamides, including nylon; polyethylene and fluoro plastics. The mold sections 50 would, of course, be formed preferably of elastomeric material such as rubber, neoprene, silicone rubber or the like. These should be selected according to the temperature requirements of the injected material. Accordingly, an elastomeric mold is provided the sections of which may be backed up by hydraulic pressures or pressures generated by other fluids as a consequence of the pipes 46 and 47 communicating with the cavities to the rear of the mold sections.

In order to furnish proper pressures in this connection and which pressures will come into being only at properly timed intervals, a booster mechanism is employed. This may conveniently take the form of a cam rod 54 connected to the rod 29 which extends through the passage 28; such rod 54 mounting a cam 55. Adjacent that cam a cylinder 56 is mounted and the internal structure of which has been somewhat diagrammatically shown in Fig. 7. In that view numeral 57 indicates a spring pressed rod, the outer end of which may be shifted by cam 55 with a provision for adjustment in the resultant effective stroke. A piston 58 is disposed within the cylinder 56 and connected to the rod 57. A line 59 connects the cylinder with line 30 and a valve 60 may be interposed in line 59. Consequently as piston 26 reciprocates, it will, at the limit of its inward stroke, cause cam 55 to shift piston 58 thus creating a surge or increase of pressure within line 30. This will be communicated to the blocks 42 and 43 in the form of fluid acting under pressure against the outer faces of the rubber mold sections. As afore brought out, in addition to the regulating valve 60, regulation of these pressures may be effected through valves 48 interposed in the lines 46 and 47.

As previously mentioned, the mold sections 50 herein shown are merely illustrative of a simpler form of mold configuration which may be employed. Under usual conditions, the mold sections should completely fill all parts of the mold cavity from a point spaced from the rear face of said cavity to the edge of the block which mates with the adjacent block. Under these circumstances, excessive fins will not be produced. If difficulty should be experienced, then the molds may be, for example, slightly recessed in the cavity and a shim 61 may overlie the mold sections and prevent excessive flash. Such recessing has been generally indicated in Fig. 4, the shim 61 having been shown in Fig. 3. An apparatus by means of which the mold sections may be conveniently produced has been somewhat diagrammatically indicated in Figs. 5 and 6, in which the numeral 62 indicates a chase provided with a cover 63 and a cavity such that it may receive a mold frame 64. A hob 65 formed of any proper metal or other suitable material may be secured to the cover and suitable fastening devices are provided to secure the parts in position.

Accordingly, a space is defined within the chase between the base and side walls of its recess, the frame 64 and the hob 65. A suitable mass of rubber may be introduced into this space and all voids may be eliminated. Thereafter, the rubber mass may be suitably cured. Consequently, with the removal of the cover 63, a desired mold section is rendered available.

This method and apparatus may be adapted to quantity production molding of cast plastics by using a multiplicity of molds without the use of injection molding machines to fill the same. These molds would have the same general form shown in Figs. 1 and 4, but would be filled with the sprue in a vertical position by gravity from a tank of casting resin. The mold so filled would be vibrated to insure complete filling of the molds and to vent any trapped air present. After this the molds would be moved either mechanically by means of a conveyor or by means of a "buggy" to an oven where the casting resin would be polymerized by means of heat.

In such a case, the molds might be furnished with a valve or valves which would permit a retention of the back-up liquid. The latter should have a very low vapor pressure to prevent any distortion of the elastomeric cavity under the influence of oven heat (140-180° F.). Examples of such liquid are glycerin, silica oil and lubricating oil. With polymerization of the casting resin completed, ejection of the molded body is readily accomplished by connecting the back-up liquid chambers with hydraulic lines. The molds would be provided with clamps which would be released. The guide pins would function to confine the travel of the mold sections to proper paths. Therefore with the application of liquid pressure the mold sections would be properly parted and the molded units freed from the sections.

An apparatus capable of performing the desired functions has been somewhat schematically illustrated in Figs. 8 to 12 inclusive. In these views the numeral 66 indicates mold assemblies which pass through a heating chamber or oven 67. They may be moved by a conveyor 68 and during such movement cooperate with guides 69 and 70 which are flared or diverged to provide an entrance portion as indicated at 71. The movements imparted to the molds by the conveyor may be conveniently a step by step shifting. A tank 72 containing casting resin is provided at a point in advance of the oven 67. Adjacent the discharge or rear end of the latter, nozzles 73 may be furnished connected to pressure line 74 for purposes hereinafter brought out. A vibrating cam has been indicated at 75 and is disposed adjacent the filling station of the molds.

Figure 11:
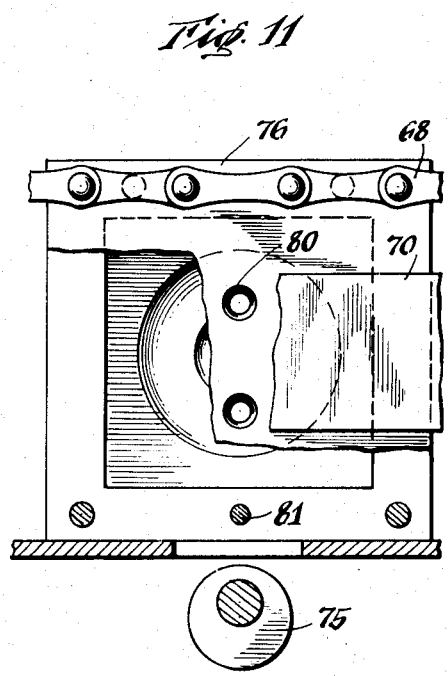
Fig. 11 is a side view of the parts as shown in Fig. 10 with certain of the structures broken away to disclose underlying construction.

Returning now to the detailed structure shown in Figs. 10 and 11, it will be seen that the numeral 76 indicates the mold sections, each provided with a backing chamber as heretofore described. Extending into these chambers are the bodies of the mold proper as indicated at 77; such bodies being preferably formed of rubber or other suitable material. A sprue 78 is furnished into which the nozzle 79 of tank or receptacle 72 may discharge. As will be apparent this nozzle or orifice of the tank may move laterally with the mold sections if the conveyor 68 moves continuously. Otherwise, it may be manipulated by suitable mechanism to move toward and away from the mold sections as they shift intermittently and should such movement of the nozzle be necessary.

Passages 80 extend from the outer faces of the mold sections to communicate with the cavities to the rear of the mold body 77. In order to not unnecessarily add to the illustrations, no valves have been shown in association with these passages or ports 80. Such valves would be used where a back-up liquid is employed and in order to retain the same. As afore brought out, where liquid of this type is utilized in connection with the structure under consideration, it should have a very low vapor pressure. Likewise it will be understood that in order to avoid unnecessary illustration, clamps which might be employed to retain the mold sections in operative association have not been illustrated although guide pins 81 have been indicated. These, of course, serve to confine the travel of the mold sections to proper paths. If clamps are employed in view of the fact that the mold sections are not adequately retained by the members 69 and 70, then a suitable quick-release mechanism (not shown) may be employed to assure the inoperativeness of the clamps as the mold assemblies reach points adjacent the discharge station of the apparatus.

Figure 12:
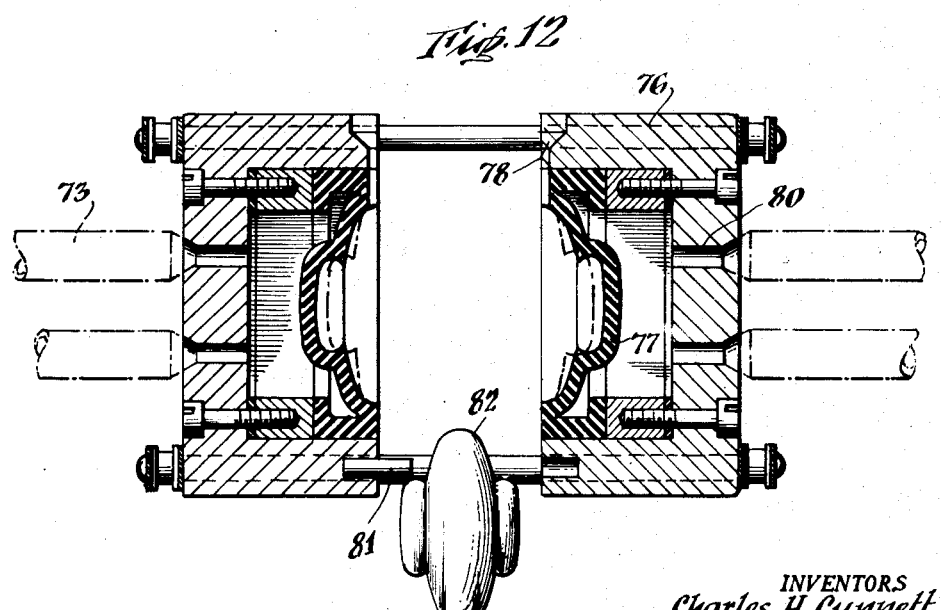
Fig. 12 is a view similar to Fig. 10 but showing the parts in open or final condition.

At such discharge station, and as indicated in Fig. 12, the nozzles 73 may be suitably associated with the ports or passages 80. Thus, additional liquid may be introduced into the mold acivities to an extent such that the mold bodies 77 are deformed. This will assure a separation of the mold sections as well as a discharge of the formed unit 82 from the same. As is obvious in the event back-up liquid is not employed, air might be utilized to discharge through the nozzle 73 to assure this result. In the latter event, only a single port of passage 80 will have to form a part of a given mold section.

As also indicated in Fig. 12, by dotted lines, an increase of suitable fluid passage within the back-up cavities would cause a deformation of the mold bodies to an extent such that they would define operative surfaces of less size than when not subjected to this distortion. It is contemplated that in accordance with the present teachings a single mold assembly may be employed to produce otherwise identical articles which, however, vary in size. In other words, if a maximum allowable pressure is exerted upon the rear faces of the mold bodies and the latter are filled with plastic material, then a unit which will have the smallest allowable dimensions will result. A lesser pressure (with the same packing or filling pressure) will result in a larger unit. In this manner, it will be feasible, under certain conditions, to produce three different sized articles by a single pair of mold sections. As will be understood, this teaching of the invention is applicable to both injection moldings as well as casting of the type exemplified in Figs. 8 to 12.

In the operation of the apparatus of these figures it is obvious that pairs of mold sections will be disposed upon the conveyor with their guide pins in proper cooperation with their bodies. Clamps may also be employed, should this prove to be necessary. In any event, as the conveyor moves the assemblies towards the oven or heating chamber, the divergent sections 71 act as guides and members 69 and 70 act to retain the sections. The mold cavities are filled by a gravity action and simultaneously the assemblies may be vibrated by, for example, mechanisms schematically indicated at 75. Such vibrations will assure a compacting of the material and the elimination of all voids. As afore brought out, back-up liquid may be disposed in the mold cavities should this prove necessary. The material will now pass through the oven and after a proper interval of time will move beyond the same to the discharge station. At that station, the mold sections are separated and the molded article is discharged.

Now returning to a consideration of the structures shown in Figs. 1 to 4 inclusive and Fig. 7, it will be understood in operation that the hopper 20 receives a mass of liquid material 21. With the operation of the parts properly timed, a suitable quantity of this material will, in each instance, be discharged by the measuring piston or equivalent mechanism into the bore of tube 24.

So positioned, it may be forced by the ram 25 through the heating chamber and from the nozzle 36 into the mold cavities. The latter will, of course, be disposed in cooperating relationship in the manner shown in Fig. 1 to embrace closed chambers which may be vented. As the last of the material is injected into these cavities the fluid pressure to the rear of the mold will be increased by, for example, the booster cylinder 56. Thus, a distortion of the mold sections will be prevented.

Where plastics capable of being moved by hydrostatic pressures are employed, it may, in certain instances, be desirable under the employment of liquid within spaces 42 and 44 to have that liquid of the same specific gravity as the plastic material. This may obviously be accomplished in a number of different manners. In its simplest aspects and under the employment of water the specific gravity of the latter may be increased by adding a suitable quantity of salt. Ordinarily hydraulic liquids will be employed to back up the mold sections. Where compressible fluids such as air are employed, then, of course, the pressure exerted by that fluid should be regulated so that a proper balance is maintained at all times.

With the articles molded as shown in Fig. 2, it will be appreciated that these articles will resist any separation of the blocks 42 and 43. However, the pressure of the backing fluid may be employed to free the formed articles from the mold cavities. To this end, every second stroke of the piston 26 will also assure an increase or boosting of the fluid pressure within line 30. Under these circumstances, prior to the second stroke, the measuring piston 22 or its equivalent may be held in an inoperative position. As indicated in Fig. 4, the increase in the fluid pressure against the rear face of any mold sections will cause that section to flex. Therefore, the formed articles will be freed from the mold portions which have formed it. As is obvious, the pressure might be increased to actually cause the formed articles to be somewhat forcibly ejected from association with the mold sections.

As heretofore traversed in connection with Fig. 12, any of the mold assemblies embodying the present teachings may ordinarily be employed to turn out a multiplicity of sizes of a given article. Ordinarily the invention will be especially useful in connection with non-metallic plastics which liquefy and exhibit true hydraulic pressures. However, where solids are employed which tend to bag the mold sections the specific gravity of the hydraulic backing fluid may be increased.

Thus, among others, the several objects of the invention as specifically afore noted are achieved. Obviously, numerous changes in construction and rearrangement of the parts may be resorted to and the steps of the method may be varied without departing from the spirit of the invention, as defined by the claims.

We claim:

1. A molding apparatus comprising complementary mold sections defining the mold cavity said sections including wall portions made of resilient and self-sustaining material which will completely resume its initial shape subsequent to deformation by external force, an inlet to said cavity, a feeding element associated with said inlet for injecting material under pressure into said mold cavity, support members for said mold sections, the said members being arranged in partly spaced relationship to said mold sections and thereby defining an enclosed space adjacent each of said wall portions, means, operable by pressure, for moving said feeding element, and ducts connecting said feeding element moving means and said enclosed spaces to a source of hydrostatic pressure.

2. A method of molding plastic materials in a flexible and deformable mold cavity, comprising the step of injecting the material under pressure into the mold cavity so as to exert an internal pressure against its walls and, concurrently therewith, the step of applying a controlled amount of pressure to the exterior of said walls, the latter pressure being directed generally in opposition to the first mentioned pressure, followed, after conclusion of the molding, by the step of applying pressure solely against the exterior of said walls so as to eject the material from the mold.

3. A molding apparatus comprising a mold having an internal cavity, wall portions made of resilient and selfsustaining material which will completely resume its initial shape subsequent to deformation by external force, said wall portions defining said cavity, an inlet to said cavity, a feeding element associated with said inlet for injecting material under pressure into said internal cavity, a mechanism, operated by pressure for moving the said feeding element, blocks contiguous to each of the said wall portions and defining an enclosed space between each of the said blocks and their respective wall portions, a pressure system, ducts connecting each of said enclosed spaces and the said mechanism with said pressure system, and means to correlate the pressure exerted through each of said enclosed spaces against the exterior of their respective wall portions with the pressure exerted against the interior of each of said wall portions by the action of said feeding element upon the injection material.

4. A molding apparatus having an internal cavity, wall portions made of resilient and self-sustaining material which will completely resume its initial shape subsequent to deformation by external force, said wall portions defining said cavity, blocks contiguous to each of said wall portions and defining enclosed spaces between each of said blocks and their respective wall portions, an inlet to said cavity, an injection plunger for feeding material under pressure into said cavity, a cylinder, a piston associated with said plunger and adapted to move within said cylinder, spaced ducts for optionally admitting pressure to said cylinder forwardly and rearwardly of said piston so as to impart a reciprocal moving to the piston and plugger, and means for producing interdependent pressure forces in said cylinder and in said enclosed space.

CHARLES H. CUPPETT.
JOHN TAYLOR.

References Cited in the file of this patent
UNITED STATES PATENTS

| Number | Name | Date |
|---|---|---|
| 2,145,956 | Stern | Feb. 7, 1939 |
| 2,152,738 | Jeffery | Apr. 4, 1939 |
| 2,218,260 | Forbes | Oct. 15, 1940 |
| 2,352,083 | Detjen | June 20, 1944 |
| 2,356,634 | Von Opel | Aug. 22, 1944 |
| 2,365,282 | Lester et al. | Dec. 19, 1944 |
| 2,375,955 | Smith | May 15, 1945 |